US012769279B2

(12) United States Patent
Mupende et al.

(10) Patent No.: US 12,769,279 B2
(45) Date of Patent: Oct. 20, 2026

(54) APPARATUS FOR DETERMINING THE ACTUAL STATE AND/OR THE REMAINING SERVICE LIFE OF STRUCTURAL COMPONENTS OF A WORK MACHINE

(71) Applicant: Liebherr-Components Biberach GmbH, Biberach an der Riss (DE)

(72) Inventors: Yvon Ilaka Mupende, Neu-Ulm (DE); Lennart Schierholz, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 442 days.

(21) Appl. No.: 18/502,864

(22) Filed: Nov. 6, 2023

(65) Prior Publication Data

US 2024/0103484 A1 Mar. 28, 2024

Related U.S. Application Data

(63) Continuation of application No. PCT/EP2022/061468, filed on Apr. 29, 2022.

(30) Foreign Application Priority Data

May 6, 2021 (DE) .......................... 102021111797.6
Aug. 6, 2021 (DE) .......................... 102021120491.7

(51) Int. Cl.
*G05B 19/4065* (2006.01)
*G01N 29/12* (2006.01)
*G01N 29/44* (2006.01)

(52) U.S. Cl.
CPC ......... *G05B 19/4065* (2013.01); *G01N 29/12* (2013.01); *G01N 29/4481* (2013.01); (Continued)

(58) Field of Classification Search
CPC ...... G05B 19/4065; G05B 2219/37209; G01N 29/12; G01N 29/4481; G01N 2291/0258; (Continued)

(56) References Cited

U.S. PATENT DOCUMENTS 5,439,431 A * 8/1995 Hessbruggen ......... B23Q 11/08 29/DIG. 56
6,707,762 B1 3/2004 Goodman et al.
(Continued)

FOREIGN PATENT DOCUMENTS

CN 101346268 B * 4/2012 .......... B61L 15/0072
CN 106794107 A * 5/2017 ......... A63B 22/0076
(Continued)

*Primary Examiner* — Tung S Lau
(74) *Attorney, Agent, or Firm* — Levine Bagade Han LLP

(57) ABSTRACT

The present invention relates to an apparatus for determining the actual state and/or the remaining service life of structural components, for example large-diameter rolling bearings, of a work machine, in particular a construction machine, a material-handling machine and/or a conveyor machine, comprising a sensor system for acquiring state information relating to the structural component, and an analytical device for analyzing the acquired state information and determining the actual state and/or the remaining service life on the basis of a comparison with predetermined damage characteristics, wherein an active database device is provided for storing the damage characteristics, to which database device a determination device for determining the damage characteristics from design data of the structural component, and an adjustment device for adjusting the predetermined damage characteristics on the basis of the state and/or the remaining service life information determined by the evaluation device are connected.

9 Claims, 4 Drawing Sheets

(52) U.S. Cl.
CPC ................ *G01N 2291/0258* (2013.01); *G05B 2219/37209* (2013.01)

(58) Field of Classification Search
CPC ............. G01N 29/043; G01N 29/4472; G01N 29/449; G01N 29/14; F16C 2233/00
See application file for complete search history.

(56) References Cited

U.S. PATENT DOCUMENTS

| | | | | |
|---|---|---|---|---|
| 9,334,896 | B2 * | 5/2016 | Braun | B65G 15/60 |
| 2006/0020402 | A1 * | 1/2006 | Bischoff | G01H 1/00<br>702/34 |
| 2010/0023307 | A1 | 1/2010 | Lee et al. | |
| 2021/0072727 | A1 | 3/2021 | Stanger | |

FOREIGN PATENT DOCUMENTS

| | | |
|---|---|---|
| CN | 117242342 | 12/2023 |
| DE | 3734487 | 4/1989 |
| DE | 4447288 | 7/1995 |
| DE | 10145571 | 3/2002 |
| DE | 102004006848 | 9/2005 |
| DE | 102016105877 | 10/2017 |
| EP | 2402731 | 1/2012 |
| JP | H08-144312 | 6/1996 |
| WO | WO 2022/233724 | 11/2022 |

* cited by examiner

APPARATUS FOR DETERMINING THE ACTUAL STATE AND/OR THE REMAINING SERVICE LIFE OF STRUCTURAL COMPONENTS OF A WORK MACHINE

CROSS-REFERENCE TO RELATED APPLICATIONS

This application is a continuation of International Patent Application Number PCT/EP2022/061468 filed Apr. 29, 2022, which claims priority to German Patent Application Numbers DE 102021111797.6 filed May 6, 2021 and DE 102021120491.7 filed Aug. 6, 2021, which are incorporated herein by reference in their entireties.

BACKGROUND

The present invention relates to an apparatus for determining the actual state and/or the remaining service life of structural components, for example large-diameter rolling bearings, of a work machine, in particular a construction machine, a material-handling machine and/or a conveyor machine, comprising a sensor system for acquiring state information relating to the structural component, and an analytical device for analyzing the acquired state information and determining the actual state and/or the remaining service life on the basis of a comparison with predetermined damage characteristics.

For construction machines such as excavators, cranes, dump trucks, dozers, bulldozers or rope excavators, or materials-handling machines or conveyor machines such as forklifts and loaders, or other larger work machines such as surface milling machines or ship cranes, it is equally important and difficult to predict the remaining service life or the remaining time before a structural part needs to be replaced. If a construction machine fails while in use at a construction site, for example because a bearing seizes or overheats, it is often not possible to immediately obtain a suitable replacement machine and deliver it to the construction site, causing delays on the construction site during the repair time required for the repair, while often not only the tasks of the failed construction machinery themselves remain undone, but other processes also encounter delays due to the interlinked operations of various construction machinery. A similar problem also arises with said material handling machines and conveyors.

These are often only individual components or structural components that are easy to replace per se and would not cause any major consequential delays if the replacement can be planned in good time, but on the other hand can also cause major repair expenses if other machine components are also affected when the small structural component breaks.

In this respect, it is normal for structural components to show a certain amount of wear as their service life progresses, without this immediately necessitating replacement of the component. As long as the function of the component is guaranteed and there is no threat of failure, such signs of wear, which are not dangerous for operation, are accepted in order to maximize the service life. Such minor, tolerable signs of wear can be, for example, small hairline cracks that are not critical for strength, or minor surface chipping or pitting of less functionally relevant surfaces. Such signs of wear can also be other component changes such as decreasing elasticity or increasing bearing clearance.

Depending on how the structural components of a work machine are monitored, it can be very difficult to differentiate between critical damage and non-critical damage, since the signal response of the component-monitoring sensor system in the case of even minor component changes can show changes of greater or lesser significance.

Moreover, many different types of damage and the damage characteristics associated therewith can occur on the structural components, which can be reflected in correspondingly different conspicuities in the sensor data. For example, oscillations that occur as a result of normal, so to speak uniform wear on the gears of a gear stage may be different from oscillations that are caused, for example, by a single, more severely damaged tooth of a gear pair. Another oscillation pattern can result from a lack of lubricant and the sluggishness related thereto due to overheating or in case of untrue running due to contamination or excessive bearing clearance.

Therefore, there have already been proposals for sensory surveillance systems for construction machinery, which are intended to render the determination of the actual states of construction machinery more objective on the basis of measured sensor data. In this respect, it is known, for example, to monitor certain operating parameters of the construction machinery and to output an error code in the event of irregularities or unusual values of the measured operating parameters, cf., for example, JP-OS-8-144 312. Nevertheless, such fault codes are not as such very meaningful or reliable, since, for example, briefly exceeding a permissible speed, as can occur, for example, when driving downhill in a construction site access road, does not yet allow a reliable statement to be made about engine damage caused as a result.

The document DE 101 45 571 A1 of the Applicant Komatsu also proposes a surveillance system for construction machines which aims to predict the degree of damage or abnormality in a more differentiated manner. For this purpose, on the one hand the exhaust gas pressure and the exhaust gas temperature of the construction machinery fuel are monitored by sensors, and on the other hand the lubricating oil is analyzed for certain components such as iron particles by means of a special analysis device. In addition to these sensory monitoring variables, however, said prior art document still considers it necessary to include the result of a visual inspection carried out by an experienced maintenance person in the automated assessment of the actual state of the construction machine. On the one hand, this previously known surveillance system for construction machinery suffers from a limited reliability of the state information. Due to the monitored exhaust gas variables exhaust gas temperature and exhaust gas pressure, mainly only problems on the diesel can be determined. On the other hand, the surveillance system is still relatively costly, as visual inspections have to be carried out by maintenance staff.

It is therefore the underlying object of the present invention to provide an improved apparatus for determining the actual state and/or the remaining service life of a construction machine, which avoids disadvantages of the prior art and develops the latter in an advantageous manner. In particular, the aim is to achieve a reliable determination of the actual state and/or remaining service life that is easy to implement on mobile construction machinery and enables maintenance and repair measures to be taken and planned in good time, even by a non-trained maintenance person, with a sufficient lead time.

SUMMARY

Said task is solved, according to the invention, by an apparatus as claimed in claim 1. Preferred embodiments of the invention are the subject-matter of the dependent claims.

In order to reflect the variety of possible damage characteristics, it is therefore proposed to artificially generate synthetic damage characteristics in the form of samples or reference examples based on the design or the geometry and material data, and to continuously adjust these synthetically generated damage characteristics by feeding back real state information determined from the sensor data. According to the invention, provision is made for an active database device for storing the damage characteristics, to which a determination device for determining the damage characteristics from design data of the structural component and an adjustment device for adapting the predetermined damage characteristics on the basis of the actual state and/or the remaining service life information determined by the evaluation device are connected. By synthetically generating damage characteristics from the design data of the structural component on the one hand, and then adjusting the synthetically generated damage characteristics by feedback of the evaluated state and/or the remaining service life information on the other hand, a complex damage characteristics model can be created for determining the actual state and/or the remaining service life, which reflects the variety of possible damage and provides a high degree of accuracy in determining the actual state and/or the remaining service life.

In determining the synthetic damage characteristics, for calculating the parameters or data set constituting the particular damage characteristic sample, there can be used a variety of design data. For example, from the design data such as the number of rolling elements, the number of rows, the intended speed and/or from the geometrical variables such as diameter, raceway width or pitch circle diameter and/or from the material data of the structural component such as rolling element and raceway hardness or rolling element and raceway material, for a rolling bearing there can be calculated the relevant damage indicators such as the roll-over frequency of the bearing outer ring, a temperature curve over the operating time, or an acoustic emission pattern, or there can be determined the frequency spectrum of the envelope signal for a given speed. In particular, the determination device for determining the damage characteristics from design data can comprise a module for determining and/or calculating kinematic frequencies from geometry data and/or operating data such as rotational speed and/or motion speed and, if applicable, taking into account material data such as weight or hardness, wherein said module preferably determines the kinematic frequencies independently of acting external forces or energies.

Advantageously, said determination device may further comprise an adjustment module to adjust and transform oscillation or frequency patterns or spectra corresponding to different damage types or damage patterns to the respective system by means of the calculated or determined kinematics, in particular by means of said kinematic frequency, so that the adapted frequency patterns or spectra are generated which reflect different damage types or patterns of the specific system or the specific component of interest. The output frequency patterns or spectra that have not yet been adapted can be determined beforehand on other, real components by measurement or are also known in catalog form from damage pattern libraries. For example, a damage pattern memory can be connected to the determination device, from which the determination device can take or read out the frequency patterns that have not yet been adapted and then adapt them with the aid of the previously determined kinematic frequency or the kinematics of the specific component. The adapted damage patterns or spectra can then be stored again in a memory.

If localized damage occurs on a bearing, such as rolling element indentations, fretting corrosion or breakouts, these can be detected, for example, by means of oscillation measurements. When rolling over local depressions, shock waves are generated which, on the one hand, can be calculated or estimated during synthetic determination and, on the other hand, can be recorded by displacement, velocity or acceleration transducers or, if necessary, other sensor systems. For example, the actual state or damage of the bearing can be determined by matching the detected roll-over frequency with previously synthetically determined roll-over frequency damage patterns.

Similarly, a structure-borne sound pattern of the structural component can also be calculated, estimated, or otherwise determined from said design data, for example, and compared with a real structure-borne sound pattern that can be acquired by means of one or more structure-borne sound sensors on the structural component to determine the actual state of the structural component. In this context, it is also possible to work with a structure-borne sound pattern library when determining the structure-borne sound patterns, from which characteristic structure-borne sound patterns are stored for determined component types and/or system types, which can then be adapted on the basis of the previously calculated or determined kinematics of the specific component or the specific system and transformed into an adapted structure-borne sound pattern.

Similarly, other synthetic damage characteristics of other structural components, such as with respect to the gear meshing frequency of a drive shaft, can be determined synthetically from design data.

Alternatively, or additionally, however, synthetic damage characteristics can be generated based on other system data, for example based on a correlation between speed and temperature via performance data. In particular, it can be assumed that a determined temperature may be expected for a determined transmitted power at a determined speed and in this respect a speed-temperature-power matrix can be generated. If unusual temperatures occur in determined power and/or speed ranges, a determined type of damage can be inferred.

In order to better reflect the complexity of possible damage patterns, a combination module can advantageously be connected to the active database device, which combines the damage characteristics generated synthetically from the design data and thereby creates combined damage characteristics that can be stored in the database device. Such combined damage characteristics can correspond to more complex damage patterns, in which not only one specific type of damage, such as breakouts in the rolling bearing ring raceway, occurs on the corresponding structural component, but various types of damage occur simultaneously, for example, in addition to said raceway breakouts, bearing contamination or excessive bearing clearance, which can lead to uneven running.

However, said combination module can not only combine different damage patterns of a structural component, but alternatively, or in addition thereto, also combine the damage characteristics of different structural components with each other in order to be able to consider mutual influences of damage characteristics of different structural components on one another. For example, a damaged bearing and the resulting uneven running of the bearing can also influence oscillations of a gear stage supported by it and/or have an effect on the damage pattern of the gear stage, which is rotationally supported by the bearing. The combination module may therefore advantageously be configured to combine different, synthetically generated damage characteristics of a structural component with each other and/or to combine synthetically generated damage characteristics of different structural components with one another. The damage characteristics generated combinatorially in this way can also be stored in or made available from the database facility.

In order to achieve a more reliable determination of the actual state or the remaining service life, in an advantageous further development of the invention, a weighting of the individual and/or combined damage characteristics can be provided. In particular, each sample or synthetically generated damage characteristics can be weighted according to the occurrence probability, i.e., the frequency of failure of the respective component. Damage characteristics with higher occurrence probability can be weighted more heavily than damage characteristics that reflect relatively infrequently occurring damage.

The weighting module can be configured to weight the synthetically generated damage characteristics individually. Alternatively, or additionally, the weighting module can also weight the combinatorially generated damage characteristics, in particular on the basis of the probability with which a specific damage combination occurs.

When evaluating the state information determined by the sensors and matching it with the damage characteristics stored, the parameters that make up the state information can basically be evaluated in different ways or matched with the damage characteristics in different ways. For example, different parameters can also be weighted differently and/or considered in different ways here.

In this respect, a change in a respective parameter can be considered in absolute terms, e.g. in such a way that an adjustment of the predetermined damage characteristics takes place when a predetermined amount of change is exceeded. Alternatively, or additionally, however, there can also come to a summarized consideration, for example to the effect that if a predetermined change is exceeded when several parameters are considered summarily, an adjustment of the predetermined damage characteristics is carried out by the adjustment device.

The adjustment device can adjust the damage characteristics in various ways to the evaluated real state information or with the help of this state information.

In further development of the invention, the condition signal evaluation and/or the damage characteristics stored by the database are adjusted to changing condition and/or operating conditions of the structural component or aging influences not on the basis of rigid criteria, but with the aid of a self-perpetuating, variable rule set. In particular, in further development of the invention, said evaluation device and the adjustment device are acquired as a self-learning system or said components form a part of a self-learning system which can estimate the influence of the acquired state and/or operating information or the real information patterns derived therefrom on the damage characteristics or on the set of parameters representing a damage pattern of the.

In particular, the evaluation device and said adjustment device may be configured with artificial intelligence or implemented in an AI system that may comprise, for example, a regression analysis module to estimate a relationship between the acquired condition and/or operational information and the synthetically generated condition or damage reference patterns of the work machine or structural component. For example, said regression analysis module can adjust or further form a functional correlation between said parameters or a curve characterizing the dependence of the actual state or the remaining service life on said real state parameters, preferably using the continuously acquired changes in state and the actual state or remaining service life forecast that arises, in particular with the further aid of a training set of said parameters. Said training set of parameters can be originally given, e.g. obtained on the basis of one or more test runs, and/or continuously updated or extended, in particular on the basis of data obtained during machine operation.

In particular, the device can compare the continuously measured condition response of the structural component or the entire work machine or a subassembly thereof with the condition or operating behavior and/or damage pattern characteristic thereof by means of artificial intelligence in order to identify damage to one or more structural components, in particular crack formation.

By means of the AI system, the reference examples of the damage characteristics of the work machine and/or the structural component(s) can be adjusted, in particular, depending on the acquired, real parameter sets of the work machine and/or the structural component, which reflect the real machine condition, and their changes. This allows the forecast to be kept accurate at all times and the error rate to be minimized.

In order to be able to better monitor the work machine as a whole for damage, sensors can be associated with several structural components, e.g. rolling bearings, of the system for acquiring relevant condition parameters such as oscillations or structure-borne noise.

The evaluation device can compare the state information of the different structural components, e.g. different rolling bearings, with each other in order to compare changes in the state or the parameter set representing this state at one structural component with accompanying changes in the state information at one or more other structural components and thus to be able to acquire abnormal changes in the state more precisely. Such a comparison can be made in addition to said adaptation of the evaluation criteria and/or signal reference pattern.

In a further embodiment of the invention, the structural component may be, for example, a rolling bearing or large-diameter rolling bearing, for example, a centerless large-diameter rolling bearing with a diameter of more than 0.5 m or more than 1.0 m, and may be monitored with respect to the rollover frequency pattern and/or the structure-borne noise emissions and/or the temperature profile over the duty cycle and/or a noise emission pattern.

BRIEF DESCRIPTION OF THE DRAWINGS

The invention is explained in more detail below on the basis of a preferred exemplary embodiment and the corresponding drawings. The drawings show.

DETAILED DESCRIPTION

As shown in the figures, the Condition Monitoring System 1 comprises an active, self-implementing database 2 that stores a plurality of synthetically generated damage characteristics as reference examples 3 in the form of data records indicating various damage patterns of a structural component 4 and containing parameters on which the respective damage pattern is based or which are characteristic of the respective damage pattern.

Figure 2:
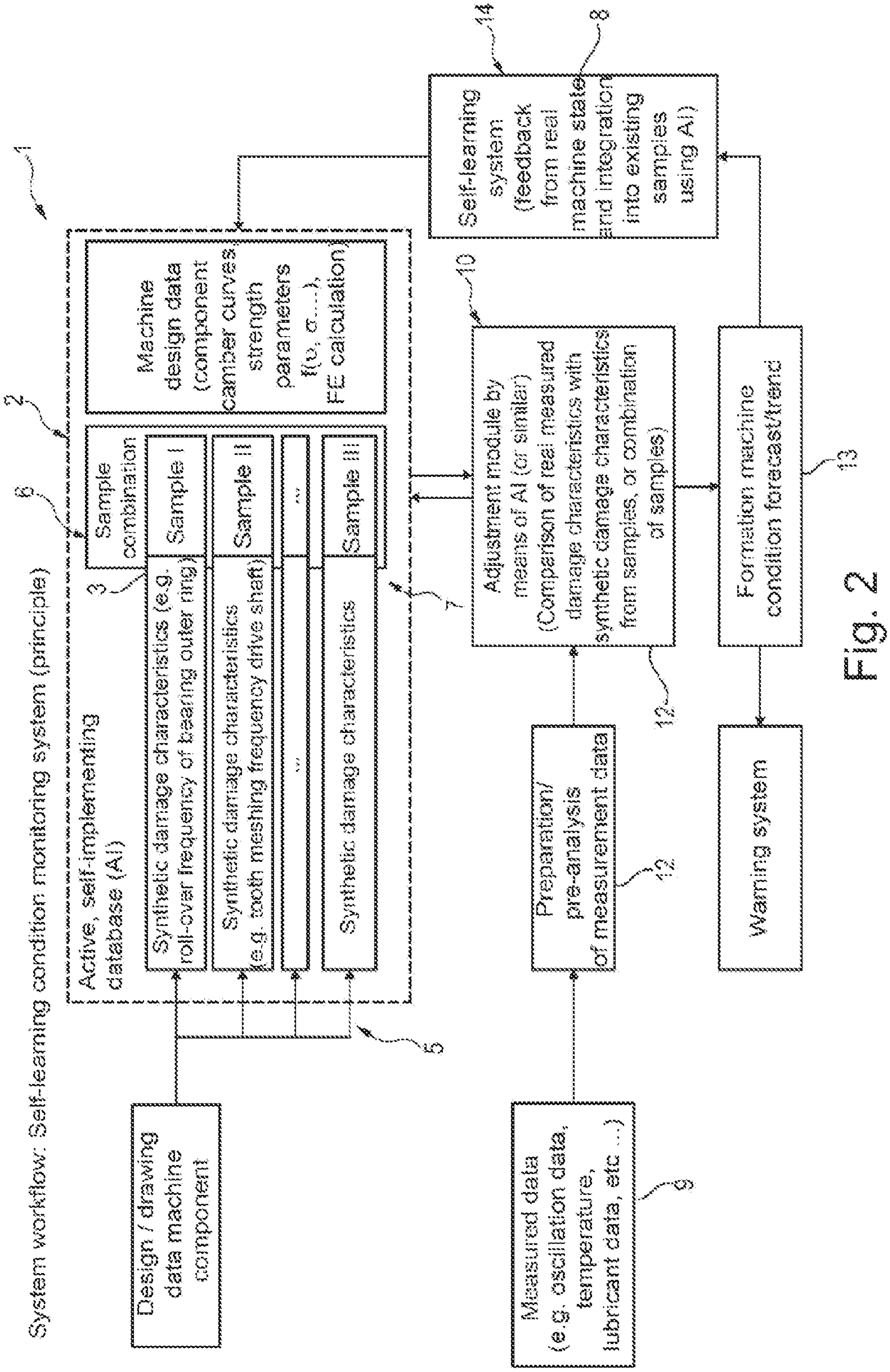
FIG. 2: shows a representation of the apparatus of FIG. 1 with supplementary details in the individual components of the apparatus.

As shown in FIG. 2, a reference example 3 designated as "Sample I" may contain the roll-over frequency of a bearing ring, for example of a bearing outer ring of a rolling bearing, wherein said roll-over frequency may contain said frequency spectrum, for example for different degrees of damage and possibly also for the undamaged state for one or more speeds.

Another reference example 3, referred to as "Sample II", may contain the damage characteristics of a drive module, for example in the form of the gear meshing frequency of a drive shaft.

Various other reference examples can include, for example, a temperature curve of a bearing over the running time and/or over the time after shutdown, or an acoustic emission spectrum of a rolling bearing, or a vibration pattern of a component or other characteristic damage patterns.

As shown in the figures, a determination device 5 can be connected to the database 2, which automatically generates said synthetic damage characteristics from design data provided on the respective structural component 4, in particular calculated from geometry and/or drawing and/or material and/or material data. Such a determination device can also estimate the damage characteristics for a particular structural component, if necessary, with the aid of stored data sets for similar structural components, and/or estimate the synthetic damage characteristics for the structural component of interest from known, typical damage characteristics for a particular structural component, for example by interpolation and/or extrapolation based on the geometry data.

For the synthetic generation of damage characteristics, the kinematics of the specific system of interest can first be calculated. In particular, kinematic frequencies can be calculated for any machine components such as rolling bearings, gears or shafts. Kinematics refers to a description of the system by its geometry and time-varying parameters independent of forces and energies.

If, for example, a rolling bearing is considered, the kinematics can be determined as follows, wherein, for example, the number of rolling elements z, the rolling element diameter $D_W$, the pitch circle diameter $D_{PW}$ under contact angle a can be assumed to be known as geometric data or, if necessary, can be obtained from a design database. In this respect, to determine the kinematics of the rolling bearing there can be carried out the following steps:

Calculating the frequency of rotation of the rolling element $$\rightarrow n_W = \pm\frac{n}{2}\cdot\left(\frac{D_{pw}}{D_W}-\frac{D_W\cdot\cos^2\alpha}{D_{pw}}\right)$$

Calculating the roll-over frequency on the inner ring $$\rightarrow n_j = \frac{z}{2}\cdot\left(1+\frac{D_W\cdot\cos\alpha}{D_{pw}}\right)$$

Calculating the roll-over frequency on the outer ring $$\rightarrow n_A = \frac{z}{2}\cdot\left(1-\frac{D_W\cdot\cos\alpha}{D_{pw}}\right)$$

Figure 3:
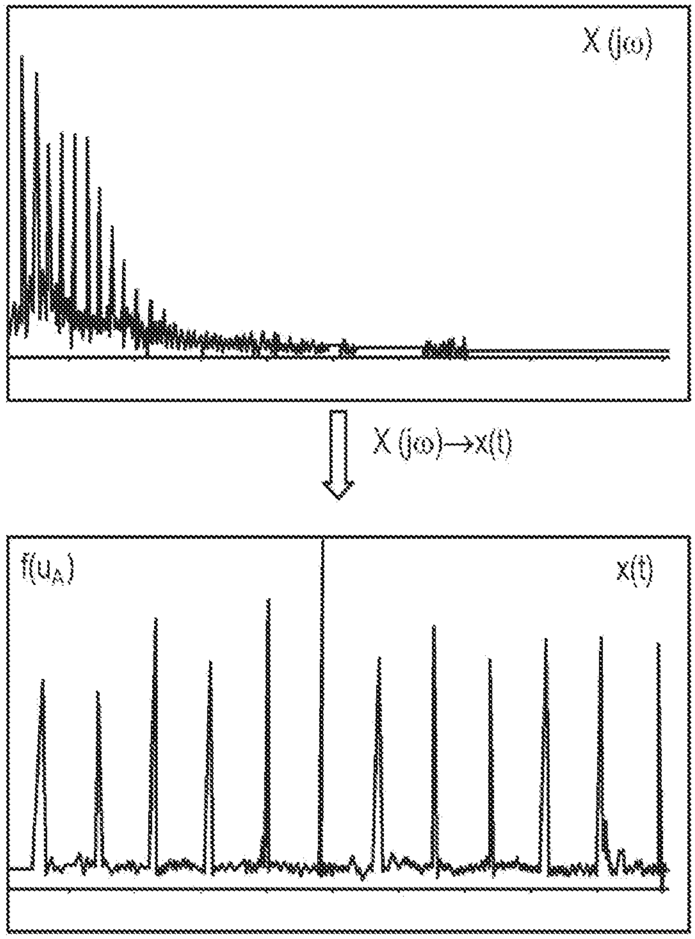
FIG. 3: shows a representation of the frequency image corresponding to a damage pattern and its transformation to a frequency damage signature specifically adapted to the system of interest.

In order to generate a damage pattern, for example for damage to the outer ring of the rolling bearing, the following procedure can be followed, cf. in particular also FIG. 3.

Generating spectra with corresponding damage information

From calculation of the roll-over frequency at the outer ring uA, damage signatures can be generated in the frequency range for bearing outer ring damage, for example (damage patterns are known (from literature) or are available from other measurements.

A normalized data set can be converted to geometric variants by means of kinematics.

As a result, therethrough there can be obtained the damage pattern according to the upper part of FIG. 3.

Transforming the damage signature in the frequency domain (f) to the time domain (f) X(jw)→x(t) to generate the excitation bursts corresponding to the machine damage characteristic f(uA), cf. FIG. 3, lower part.

Alternatively, or additionally, the following procedure can be used to create a damage pattern reflecting outer ring damage of the rolling bearing:

Generating spectra with corresponding damage information

From the structural analysis (e.g. from FE simulation) there can be determined the natural oscillation mode of the structure.

Figure 4:
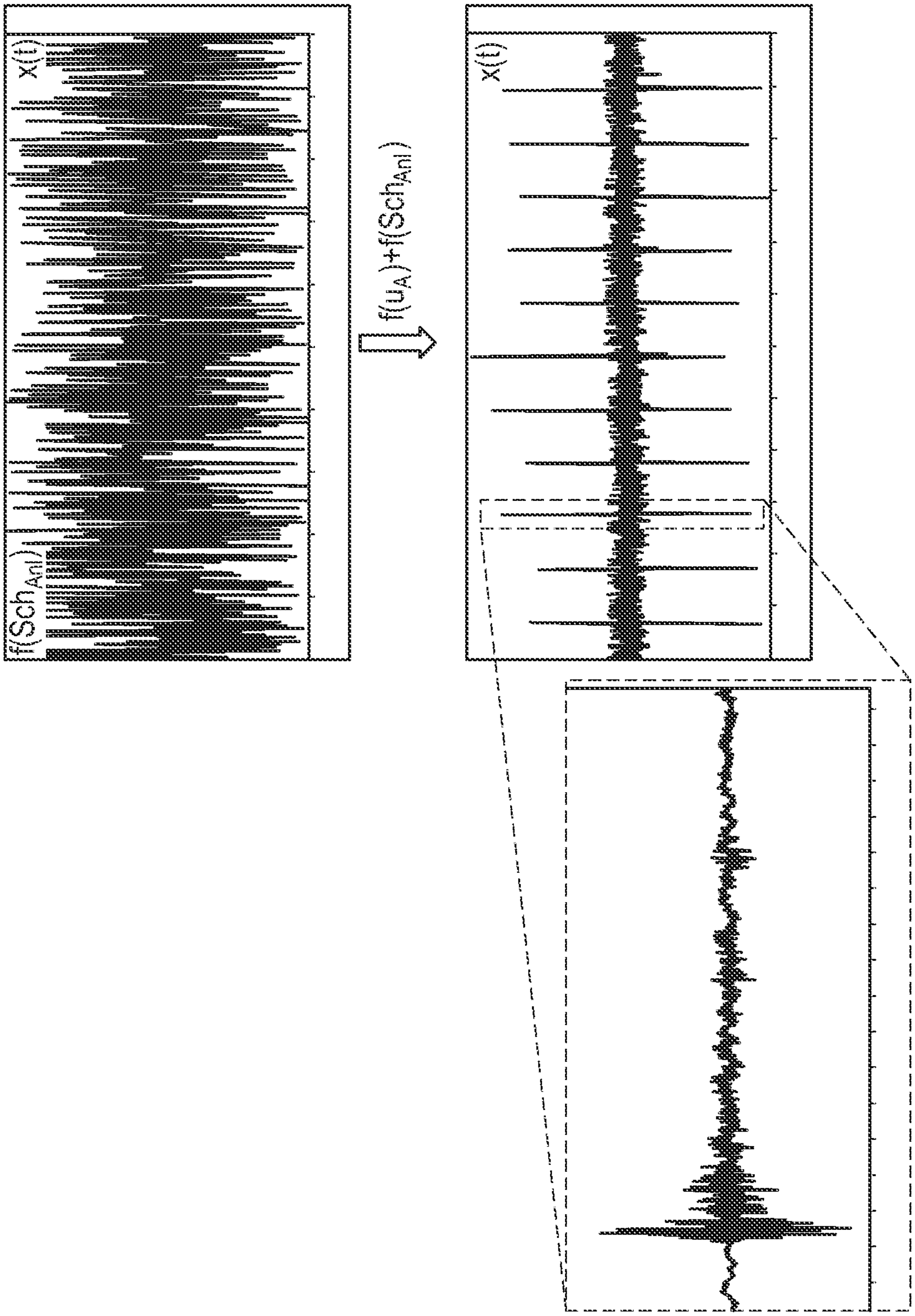
FIG. 4: shows a schematic representation of the synthetic generation of a damage characteristic starting from a fundamental oscillation image generated by structural analysis and its transformation to a specific damage characteristic image.

Generating fundamental oscillation f($Sch_{Ani}$), cf. FIG. 4 upper part Superimposition of the machine damage characteristics f($u_A$) and the fundamental oscillation f($Sch_{Ani}$) to produce synthetically generated damage characteristics/samples, cf. FIG. 4 lower part.

Advantageously, by combining the synthetic damage characteristics or samples, the structure-borne sound signature of a system or an interested component can be generated already in the design phase, thus avoiding the time-consuming learning necessary in previous monitoring systems by means of real machine failures and possibly executed using artificial intelligence. Without synthetic generation of a structure-borne sound signature or damage characterization risk based on the design data, at least 7 to 8 real systems corresponding to the system of interest would have to be tested in experiments with known failures. In contrast, the synthetically generated damage characteristics already provide the AI module with more than ⅔ of the expected damage patterns, which significantly reduces the learning time and effort required to refine the system. For example, the remaining damage characteristics that are still missing or not synthetically generated can be fed back by a self-learning system, for example, in the order of 20%.

In order to reflect more complex damage patterns or wear phenomena, a combination module 6 is advantageously associated with the active, self-implementing database 2, which combines the damage characteristics synthetically determined by the determination device 5 from the design data and thereby generates combinatorial damage characteristics.

Advantageously, the damage characteristics, for example the synthetically generated damage characteristics and/or the combinatorially determined damage characteristics, can be given a weighting which can be generated by a weighting module 7, in particular on the basis of the probability of occurrence of a respective damage event.

Said database 2 and/or the modules associated therewith for determining the damage characteristics, i.e. in particular the determination device 5 and/or the combination module 6 and/or the weighting module 7 can be part of a self-learning AI system 8 or be formed by such an AI system 8 which is equipped with artificial intelligence and can estimate or determine a relationship between a determined condition parameter or several condition parameters of a structural component and a damage pattern of the structural component and/or its actual state and/or remaining service life, wherein the AI system can comprise, for example, a regression analysis module in order to adjust said relationship between a parameter or a parameter set and the actual state or the remaining service life of the structural component on the basis of changes that occur.

As the figures further show, the Condition Monitoring System 1 further comprises a sensor system 9 which may comprise various sensors for measuring or acquiring relevant condition variables or parameters of the structural component 4 of interest, wherein said sensors may be of different types depending on the structural component.

For example, said sensor system 9 may include a structure-borne sound sensor and/or a displacement sensor and/or a velocity sensor and/or an acceleration sensor and/or a temperature sensor for acquiring corresponding state information on the structural component 4 or surrounding components connected thereto, for example, oscillation data, temperature data, lubricant data, noise emission data, or other relevant state information of the structural component 4.

Said state information acquired and provided by the sensor system 9 can be evaluated by an evaluation device 10 and compared with the damage characteristics provided by the database 2 to determine the actual state and/or the remaining service life of the structural component 4. As shown in FIG. 2, said evaluation device 10 may comprise an evaluation module 11 which compares real measured damage or condition characteristics with the synthetic damage characteristics from the reference examples 3 or the combinatorial damage characteristics formed therefrom. Upstream of such an evaluation module 11, a pre-analysis and/or processing module 12 can be provided, which processes and/or pre-analyzes the sensory acquired state information, for example by means of a filter or other signal processing modules.

Figure 1:
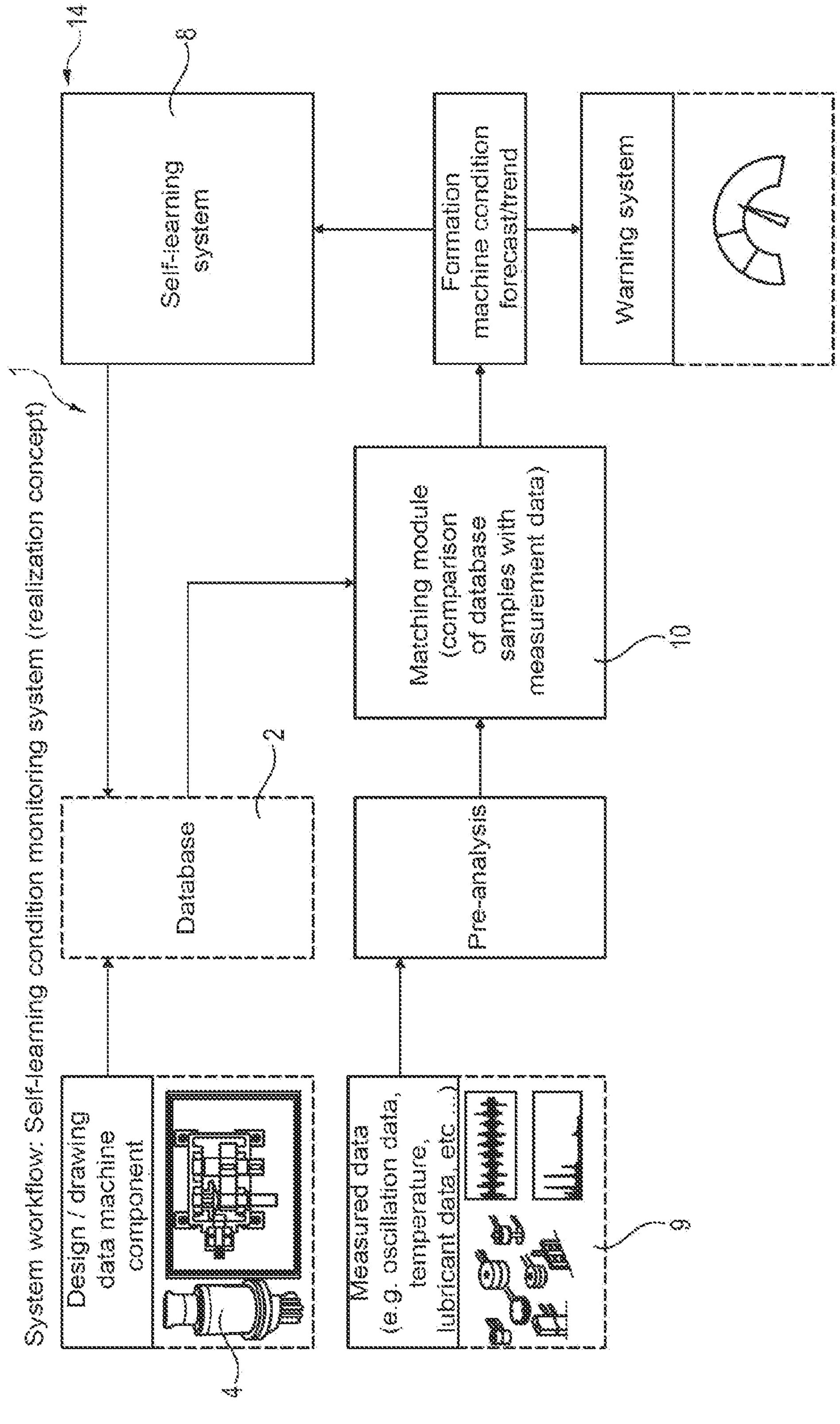
FIG. 1: shows a representation of an apparatus for determining the actual state and/or the remaining service life of structural components of a work machine according to an advantageous embodiment of the invention.

On the basis of the evaluation of the evaluation device 10, a prognosis and/or trend analysis module 13 can provide a prognosis for the actual state and/or a trend for the actual state of the structural component and/or the entire machine, see FIG. 1 and FIG. 2.

As shown in the figures, the Condition Monitoring System 1 further comprises an adjustment device 14 that adjusts the damage characteristics stored by the database 2 on the basis of the evaluations of the evaluation device 10 and/or the determined state and/or the remaining service life information.

Said adjustment device 14 is preferably part of a self-learning AI system or is formed by such an AI system 8, which provides for feeding back real machine condition data and/or integration into the existing reference examples 3 by means of artificial intelligence.

In particular, the AI system 8 can adjust the synthetic damage characteristics and/or the damage characteristics combinatorially formed therefrom depending on relevant machine condition and/or environmental parameters, in particular, for example, adjust them depending on the age of the structural component 4, the machine and/or operating condition, and changes in environmental influences. This allows the forecast to be kept accurate at all times and the error rate to be minimized.

The Condition Monitoring System 1 thus makes particular use of a data analysis model based on synthetically generated machine operating characteristics.

For this purpose, starting from the design of a component/product, synthetic operating characteristics are generated artificially in the form of samples. Each sample corresponds to a specific damage characteristic of a determined component (e.g. the roll-over frequency of bearing outer ring, the gear meshing frequency of a drive shaft, etc.) which can be calculated from geometry/drawing data.

By combining the specific, synthetic samples there is created a complex picture of all possible, measurable forms of damage. Afterwards, this database can be compared with the measured damage characteristics (e.g. due to structure-borne noise, etc.) and the condition of the component can be evaluated. Due to the large number of variations, the comparison takes place by means of artificial intelligence (AI) or comparable Feature Recognition.

The samples or reference examples of the damage characteristics, as well as the combination thereof, can be pre-stored in a matching database and associated with the respective component.

In a further configuration level, each sample can be weighted according to the occurrence probability (frequency of the cause of failure of the respective component).

Depending on the learning ability of the system, the sample database of damage features can be expanded. Additionally, through the secondary damage analysis, the system can be "rewarded" to be able to improve the detection rate for related samples (e.g., of other, but similar components).

We claim:

1. An apparatus for determining an actual state and/or a remaining service life of structural components comprising large-diameter rolling bearings of a work machine, wherein the work machine comprises a construction machine, a material-handling machine and/or a conveyor machine, comprising:

a sensor system for acquiring state information relating to a structural component, wherein the sensor system comprises at least one sensor from the group of sensors consisting of: oscillation sensors, temperature sensors, lubricant sensors, structure-borne sound sensors, acceleration sensors, displacement sensors and speed sensors;

an evaluation device for evaluating acquired state information and determining the actual state and/or the remaining service life by a comparison with predetermined damage characteristics;

an active database device for storing the damage characteristics;

a determination device for determining the damage characteristics from design data of the structural component, wherein the design data comprises a number of rolling elements, a number of rows, and an intended speed; and an adjustment device for adjusting the predetermined damage characteristics on the basis of the state and/or the remaining service life information determined by the evaluation device, wherein the adjustment device is configured to adjust the damage characteristics stored by the active database device depending on at least one signal from the at least one sensor;

wherein the adjustment device and the determination device are connected to the active database device.

2. The apparatus according to claim 1, wherein the determination device is configured to determine kinematic frequencies of the structural component from geometry data of the structural component to generate a damage frequency image for the structural component from the kinematic frequencies.

3. The apparatus of claim 2, wherein the determination device comprises an adjustment module configured to transform frequency patterns corresponding to different damage patterns and/or types into adapted frequency patterns corresponding to different damage patterns and/or types of the specific structural component based on the geometry data of the structural component.

4. The apparatus of claim 3, wherein the determination device comprises a structural analysis module for determining fundamental oscillation of the structural component and comprises a superimposition module for superimposing frequency patterns indicative of different damage patterns and/or types on the determined fundamental oscillation in order to generate synthetically generated damage characteristics adapted to the structural component by the superimposition.

5. The apparatus of claim 4, wherein the evaluation device and/or the adjustment device are configured as a self-learning system and/or as part of a self-learning system which feeds back the sensorily detected state information and/or the actual states and/or remaining service lives derived therefrom to the database and/or integrates them into the damage characteristics stored by the database.

6. The apparatus of claim 5, wherein the self-learning system comprises a regression analysis module for determining the influence of determined damage patterns and/or determined actual states on damage characterizing parameters of the structural component such as structure-borne sound signal reference patterns, roll-over frequency patterns or tooth mesh frequency patterns of the structural component by regression analysis.

7. The apparatus of claim 6, wherein the self-learning system comprises a Kl-based estimation module for estimating correlations between acquired actual state information patterns and synthetically generated damage characteristics and/or between acquired actual state information patterns and a damage pattern or a remaining service life of the structural component.

8. The apparatus according to claim 7, wherein a combination module for combining the synthetically generated damage characteristics and combinatorial damage characteristics is associated with the determination device, and wherein the evaluation device is configured to match the state information acquired by the sensor system with the combinatorial damage characteristics.

9. The apparatus according to claim 1, further comprising a weighting module for weighting the damage characteristics on the basis of an occurrence probability of a damage event corresponding to the damage characteristic, and wherein the weighting module is associated with the determination device.

* * * * *